US010208936B2

(12) United States Patent
West (10) Patent No.: US 10,208,936 B2
(45) Date of Patent: *Feb. 19, 2019

(54) MULTI-MODE PORTABLE LIGHTING DEVICE

(71) Applicant: Mag Instrument, Inc., Ontario, CA (US)

(72) Inventor: Stacey West, Ontario, CA (US)

(73) Assignee: MAG INSTRUMENT, INC., Ontario, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/729,452

(22) Filed: Oct. 10, 2017

(65) Prior Publication Data

US 2018/0031221 A1 Feb. 1, 2018

Related U.S. Application Data

(63) Continuation of application No. 14/715,592, filed on May 19, 2015, now Pat. No. 9,810,412, which is a continuation of application No. 13/436,234, filed on Mar. 30, 2012, now Pat. No. 9,035,576, which is a continuation of application No. 12/353,396, filed on Jan. 14, 2009, now Pat. No. 8,169,165.

(51) Int. Cl.
| | |
|---|---|
| *H05B 37/02* | (2006.01) |
| *H05B 33/08* | (2006.01) |
| *F21V 23/04* | (2006.01) |
| *H05B 39/06* | (2006.01) |
| *F21L 4/00* | (2006.01) |
| *F21L 4/02* | (2006.01) |
| *F21Y 115/10* | (2016.01) |

(52) U.S. Cl.
CPC .......... *F21V 23/0421* (2013.01); *F21L 4/005* (2013.01); *F21L 4/027* (2013.01); *F21V 23/0414* (2013.01); *H05B 33/0815* (2013.01); *H05B 33/0845* (2013.01); *H05B 37/0209* (2013.01); *H05B 39/06* (2013.01); *F21Y 2115/10* (2016.08); *Y02B 20/346* (2013.01)

(58) Field of Classification Search
None
See application file for complete search history.

(56) References Cited

U.S. PATENT DOCUMENTS

| | | | | |
|---|---|---|---|---|
| 2004/0021427 A1* | 2/2004 | Bruwer | ................. | H02J 7/0047 315/200 A |
| 2005/0083626 A1* | 4/2005 | Bruwer | ................ | H01H 13/063 361/93.1 |
| 2007/0133199 A1* | 6/2007 | Lebens | ................... | F21L 4/027 362/157 |

* cited by examiner

*Primary Examiner* — Jany Richardson
(74) *Attorney, Agent, or Firm* — Roy L. Anderson (57) ABSTRACT

A lighting device with a light source powered by batteries connected in series utilizes a current-limited load switch which regulates current delivered to the light source from the batteries through use of a controller electrically coupled in series with a mechanical power switch so that when the mechanical power switch is opened, the controller is not powered by the batteries, the controller including an output for providing a control signal for controlling the opening and closing of the current-limited load switch, and current delivered to the light source by the current-limited load switch is set by a resistor connected to an ISET pin of the current-limited load switch.

9 Claims, 9 Drawing Sheets

MULTI-MODE PORTABLE LIGHTING DEVICE

CROSS-REFERENCE TO RELATED APPLICATION

This is a continuation application of U.S. application Ser. No. 14/715,592, filed May 19, 2015, which is a continuation application of U.S. application Ser. No. 13/436,234, filed Mar. 30, 2012, which is a continuation application of U.S. application Ser. No. 12/353,396, filed Jan. 14, 2009, now U.S. Pat. No. 8,169,165. The foregoing applications are incorporated by reference as if fully set forth herein.

TECHNICAL FIELD

The present invention relates to portable lighting devices, including, for example, flashlights, lanterns and head lamps, and their circuitry.

BACKGROUND

Various handheld or portable lighting devices, including flashlights, are known in the art. Such lighting devices typically include one or more dry cell batteries having positive and negative electrodes. The batteries are arranged electrically in series or parallel in a battery compartment or housing. The battery compartment is also sometimes used to hold the lighting device, particularly in the case of flashlights. An electrical circuit is established from a battery electrode through conductive means which are electrically coupled with an electrode of a light source, such as a lamp bulb or a light emitting diode ("LED"). After passing through the light source, the electric circuit continues through a second electrode of the light source in electrical contact with conductive means, which in turn are in electrical contact with the other electrode of a battery. The circuit includes a switch to open or close the circuit. Actuation of the switch to close the electrical circuit enables current to pass through the lamp bulb, LED, or other light source—and through the filament, in the case of an incandescent lamp bulb—thereby generating light.

Flashlights and other portable lighting devices have conventionally employed a mechanical power switch in the main power circuit of the flashlight to turn "on" the flashlight and turn "off" the flashlight. When the user desired to turn "on" the flashlight, the user manipulated the mechanical power switch to mechanically connect two contacts to close the switch and complete the power circuit, thereby allowing current to flow from the positive terminal of the batteries, through the light source, and back to the negative terminal of the batteries. When the user desired to turn "off" the flashlight, the user manipulated the mechanical switch to disconnect the two contacts of the switch and thereby open the switch and break the power circuit. The mechanical switch in such devices, therefore, acts as a conductor in completing the power circuit and conducting current throughout the operation of the portable lighting device.

A variety of mechanical switch designs are known in the art, including, for example, push button switches, sliding switches, and rotating head switches. Such switches tend to be fairly intuitive and easy to operate by the user. However, portable lighting devices having just a simple mechanical power switch do not include automated operating modes, such as, for example, a blink mode, a power reduction mode, or an SOS mode. To include such automated functionality in a portable lighting device, the portable lighting device must have advanced electronics.

For example, multi-mode electronic flashlights and other portable lighting devices have been designed using an electronic power switch controlled by a processor of a microchip or microcontroller. In such lighting devices, the various modes that are programmed into the microchip are selected through the appropriate manipulation of a user interface, such as a momentary switch.

In one approach, the electronics of the multi-mode portable lighting device remain constantly connected to the power source. As a result, however, the electronics constantly consume power, thereby decreasing the useful battery life, or in the case of rechargeable batteries, the operational time between charges.

In another approach, a mechanical power switch, which is disposed electrically in series with the light source and controller, is used to simultaneously break the circuit powering the electronics and the light source. As a result, the electronics do not consume power from the batteries (or battery) when the portable lighting device is turned off. However, in order for the mechanical power switch to be used as the user interface to select different modes of operation by, for example, opening and then closing the mechanical power switch within a defined period of time, the microchip is provided with an alternative source of temporary power.

The alternative source of temporary power is provided so that when the mechanical power switch is opened the microchip will remain temporarily powered, even though the portable lighting device has been shut off, until the mechanical power switch is again closed. In the absence of the alternative source of temporary power, the microchip would lose power when the mechanical power switch is opened, causing the controller to reset and return to its default mode of operation the next time the mechanical power switch is closed instead of toggling to the next operational mode.

One or more capacitors arranged in parallel with the controller have been used as the alternative source of power. The capacitors are selected to have sufficient capacitance to power the controller for a suitable period of time, such as one to two seconds, following the opening of the mechanical power switch before falling below the reset voltage of the controller. Thus, as long as the mechanical power switch is again closed within the allotted time frame, the lighting device will begin to operate in the next mode of operation.

A disadvantage of this approach is that significant capacitance is required to be able to power the controller for an adequate period of time, resulting in increased cost. In addition, in some configurations, the required capacitor(s) may have a physical foot print that is larger than the amount of space available on the printed circuit board to be included in the portable lighting device.

SUMMARY

An object of the present patent document is to provide a multi-mode portable lighting device that uses a mechanical power switch as the user interface and that addresses, or at least ameliorates, one or more of the problems associated with the multi-mode portable lighting devices discussed above.

Accordingly, in a first aspect, a multi-mode portable lighting device, such as a flashlight, with multiple modes of operation is provided. The portable lighting device is operated by a mechanical power switch. Actuation of this switch powers on and off the portable lighting device. It is also used to select the mode of operation. In one embodiment, there are no other switches, inputs, or any other man to machine interface other than the single mechanical power switch. At any time when the mechanical power switch is in the off (or open) position, all circuitry is physically disconnected from the battery and no battery current is consumed. The lighting device may include a number of modes of operation and the modes of operation may include, for example, a normal mode, one or more power save modes, a flash mode, an SOS mode, etc.

According to one embodiment, the multi-mode portable lighting device comprises a housing for receiving a portable power source having a positive electrode and a negative electrode, a light source having a first electrode and a second electrode, and a main power circuit for connecting the first and second electrodes of the light source to the positive and negative electrodes of the portable power source, respectively. The main power circuit includes a mechanical power switch and an electronic power switch disposed electrically in series with the light source. The portable lighting device further comprises a controller electrically coupled in series with the mechanical power switch so that when the mechanical power switch is opened, the controller is not powered by the portable power source. The controller includes an output for providing a control signal for controlling the opening and closing of the electronic power switch, and the controller is configured to control the electronic power switch in a manner to provide at least two modes of operation. A state machine having a memory mechanism for temporarily storing a mode of operation and at least one output coupled to the controller for communicating at least one output signal to the controller is also included in the portable lighting device. Further, the controller is configured to determine the mode of operation based on at least one output signal from the state machine at power up and then to write a new mode of operation to the state machine.

According to another aspect, a method of operating a multi-mode portable lighting device including a main power circuit for connecting a light source to a portable power source and a controller for controlling an electronic power switch disposed in the main power circuit which is in electrical series with the light source, wherein the controller is electrically connected in series to a mechanical power switch disposed in the main power circuit in series with the light source and which acts as the user interface to the controller. The method comprises the steps of: using the controller at power up to read at least one output signal from a state machine to determine a first mode of operation based on the at least one output signal; and writing a second mode of operation from the controller to the state machine following power up, wherein the state machine remembers the second mode of operation for a brief period after the mechanical power switch is opened so that if the mechanical power switch is closed before the brief period lapses, the controller will operate in the second mode of operation. Preferably the brief period is long enough for a user to reliably open and close the mechanical power switch without undue difficulty. Typically a period of about 1.5 seconds should be adequate.

According to another aspect, a method of calibrating one or more memory capacitors of a driver circuit for a multi-mode portable lighting device is provided, wherein each memory capacitor is connected to a data port of a controller in parallel with a bleed off resistor. The method according to one embodiment comprises powering the driver circuit to charge each of the one or more memory capacitors, removing the power from the driver circuit for a predetermined time interval, powering the driver circuit as soon as the predetermined time interval has lapsed, and measuring the voltage value on each of the one or more memory capacitors; and storing the voltage measured for each of the one or more memory capacitors in a non-volatile memory accessible by the controller.

Further aspects, objects, desirable features, and advantages of the invention will be better understood from the following description considered in connection with accompanying drawings in which various embodiments of the disclosed invention are illustrated by way of example. It is to be expressly understood, however, that the drawings are for the purpose of illustration only and are not intended as a definition of the limits of the invention.

DETAILED DESCRIPTION

Figure 1:
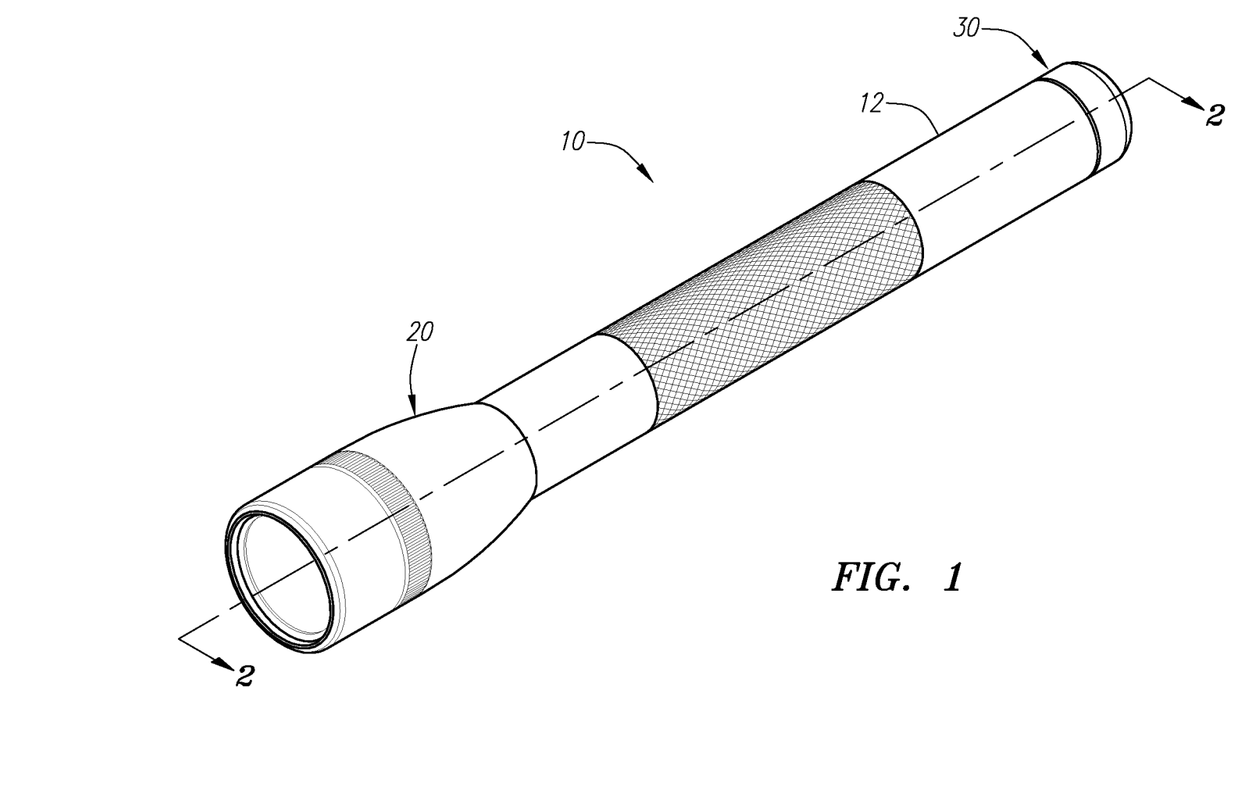
FIG. 1 is a perspective view of a flashlight according to an embodiment of the present patent document.

A multi-mode flashlight 10 according to an embodiment is illustrated in perspective in FIG. 1. The flashlight 10 incorporates a number of distinct aspects. While these distinct aspects have all been incorporated into the flashlight 10, it is to be expressly understood that the invention is not restricted to flashlight 10 described herein. Rather, the inventive features of the flashlight 10 described below, both individually as well as in combination, all form a part of the invention. Further, as will become apparent to those skilled in the art after reviewing the present disclosure, one or more aspects of the present invention may also be incorporated into other portable lighting devices, including, for example, head lamps and lanterns.

Referring to FIG. 1, the flashlight 10 includes a head assembly 20, a barrel 12, and a tail cap assembly 30. The head assembly 20 is disposed about the forward end of the barrel 12. The tail cap assembly 30 encloses the aft end of the barrel 12.

Figure 2:
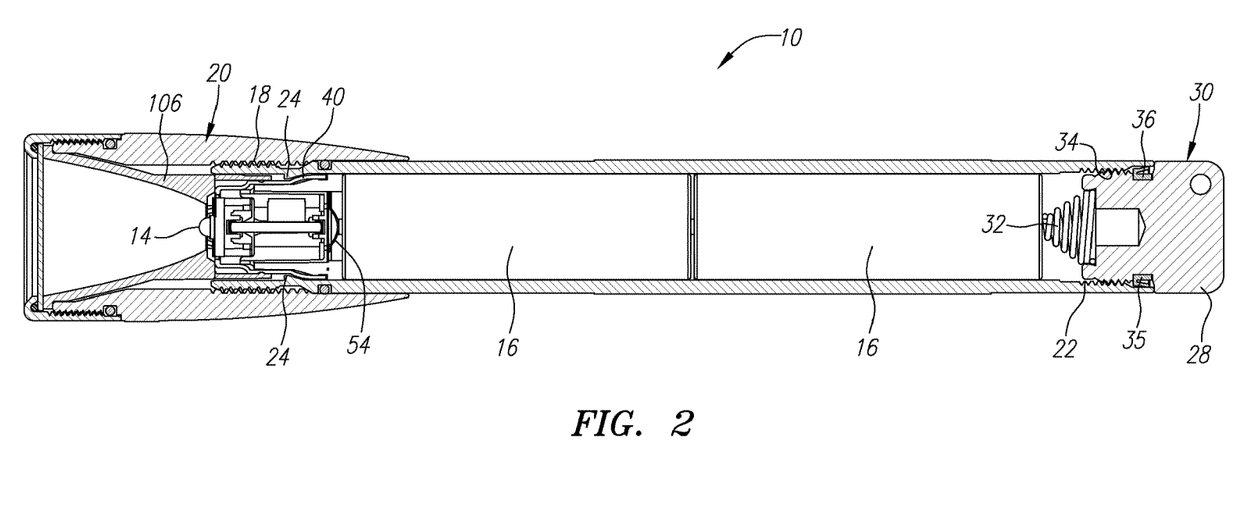
FIG. 2 is a cross-sectional view of the flashlight of FIG. 1 taken through the plane indicated by 2-2.
Figure 3:
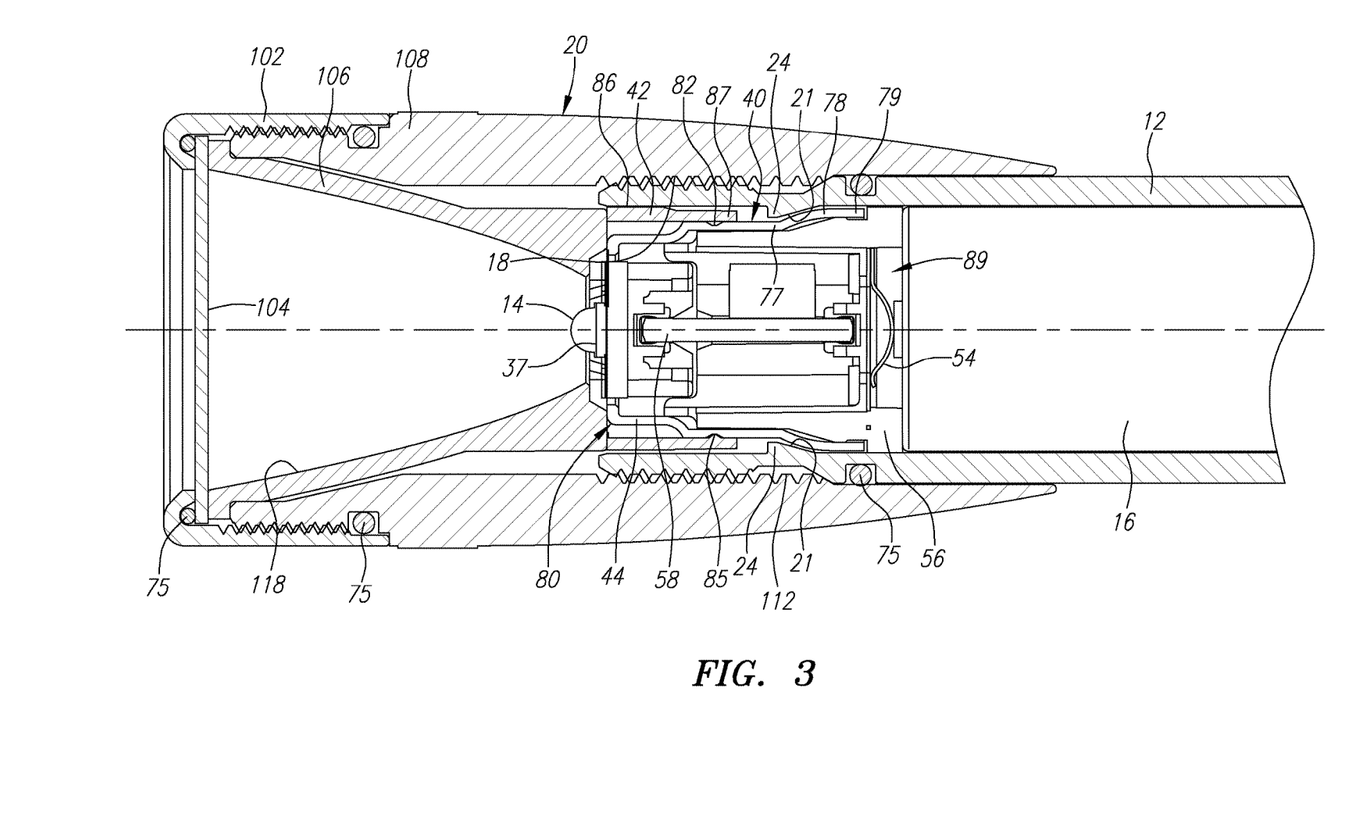
FIG. 3 is an enlarged cross-sectional side view of the front end of the flashlight of FIG. 1 as taken through the plane indicated by 2-2 where the flashlight is shown in the OFF position.

FIG. 2 is a cross-sectional view of the flashlight of FIG. 1 taken through the plane indicated by 2-2. FIG. 3 is an enlarged cross-sectional side view of the front end of the flashlight of FIG. 1 as taken through the plane indicated by 2-2. The flashlight is shown in the OFF position in FIGS. 2-3.

Referring to FIGS. 2 and 3, a light source 14 is mounted to the forward end of the barrel 12. In the present embodiment, the light source 14 is mounted so that it is disposed at the aft end of reflector 106. In other embodiments, the reflector 106 may be omitted, or its shape changed.

The barrel 12 is a hollow, tubular structure suitable for housing a portable power source, such as, for example, one or more batteries 16. Thus, the barrel 12 serves as a housing for receiving a portable power source having a positive and a negative electrode.

In the illustrative embodiment, barrel 12 is sized to accommodate two batteries 16 disposed in a series arrangement. The batteries are preferably alkaline type dry cell batteries of a AA size in the present embodiment. However, rechargeable batteries may be used instead of dry cell batteries. In addition, batteries having sizes other than AA may be used.

The barrel 12 may also be configured to include a single battery, three batteries, or a plurality of more than three batteries arranged in either a series or a side-by-side arrangement. Other suitable portable power sources, including, for example, high capacity storage capacitors, may also be used.

In the illustrated embodiment, the barrel 12 includes forward threads 18 formed on the outer diameter of its front end, and aft threads 22 formed on the inside diameter of its aft end. The barrel 12 of the present embodiment also includes an annular lip 24 of reduced diameter projecting from the inner diameter of the barrel at a forward end. An aft facing surface of the annular lip 24 forms a contact 21 for a mechanical power switch described below.

Referring to FIG. 2, the tail cap assembly 30 includes a tail cap 28 and a conductive spring member 32. The tail cap 28 preferably includes a region of external threads 34 for engaging the matching aft threads 22 formed on the interior of the barrel 12. Other suitable means may also be employed for attaching the tail cap 28 to the barrel 12. The tail cap 28 may have a different exterior configuration than that shown in FIGS. 1-2. For example, the exterior surface of the tail cap 28 may include knurling. Also, a portion of the material comprising the tail cap 28 may be removed so that a rib is formed with a hole for a lanyard.

A sealing element 36 may be provided at the interface between the tail cap 28 and the barrel 12 to provide a watertight seal. The sealing element 36 may be an O-ring or other suitable sealing devices. In the illustrated embodiment, the sealing element 36 is a one-way valve formed by a lip seal that is orientated so as to prevent flow from the outside into the interior of the flashlight 10, while simultaneously allowing overpressure within the flashlight to escape or vent to the atmosphere. Radial spines may be disposed at the interface 35 between the tail cap 28 and the barrel 12 to ensure that the end of the barrel 12 does not provide a gas tight seal against the adjacent flange of the tail cap 28, thereby impeding the flow of overpressure gases from the interior of the flashlight.

The design and use of one-way valves in flashlights are more fully described in U.S. Pat. No. 5,003,440 issued to Anthony Maglica, which is hereby incorporated by reference.

In the present embodiment, barrel 12 and tail cap 28 are formed out of metal, preferably aircraft grade aluminum. Further, the barrel 12, tail cap 28, and conductive spring member 32 form part of the ground return path from a negative electrode of the light source 14. The conductive spring member 32 is electrically coupled to the case electrode of the battery 16 and the tail cap 28. Tail cap 28 is in turn electrically coupled to the barrel 12 through interface 35. Thus, when the tail cap assembly 30 is installed in the barrel 12, the conductive spring member 32 forms an electrical path between the case electrode of the battery 16 and the tail cap 28, and the tail cap 28 forms an electrical path between the conductive spring member 32 and the barrel 12 through, for example, interface 35 and/or the mating threads 22, 34.

To facilitate the flow of electricity, any existing surface treatments, such as by anodizing, disposed at the tail cap/barrel contact and the interface between conductive spring member 32 and tail cap 28 should be removed.

In addition to acting as a conductor in the main power circuit, the conductive spring member 32 also urges the batteries 16 toward the front of the flashlight 10. As a result, the center electrode of the rear battery is in electrical contact with the case electrode of the next forward battery. In this way, the batteries 16 contained in the barrel 12 are electrically coupled. The center electrode of the forward-most battery 16 is urged into contact with a compressible positive contact 54 of lighting module 40.

Referring to FIG. 3, the lighting module 40 is disposed at the forward end of the barrel 12 and in the present embodiment, among other things, holds the light source 14 relative to a reflector 106 of the head assembly 20. The light source 14 includes a first, positive electrode in electrical communication with the positive contact 54 via second circuit board 58 and a second, negative electrode in electrical communication with the heat sink housing 44. The light source 14 may be any suitable device that generates light. For example, the light source 14 can be an LED lamp, an incandescent lamp, or an arc lamp. In the illustrated embodiment, the light source 14 is an LED lamp and lighting module 40 is an LED module. LED 37 of lighting module 40 preferably substantially radiates light at a spherical angle of less than 180°. In other embodiments, LEDs with other angles of radiation may be used, including LEDs that radiate at an angle greater than 180°.

The structure of an LED module that may be used for lighting module 40 is described in detail in co-pending U.S. patent application Ser. No. 12/188,201, which is hereby incorporated by reference.

Figure 6:
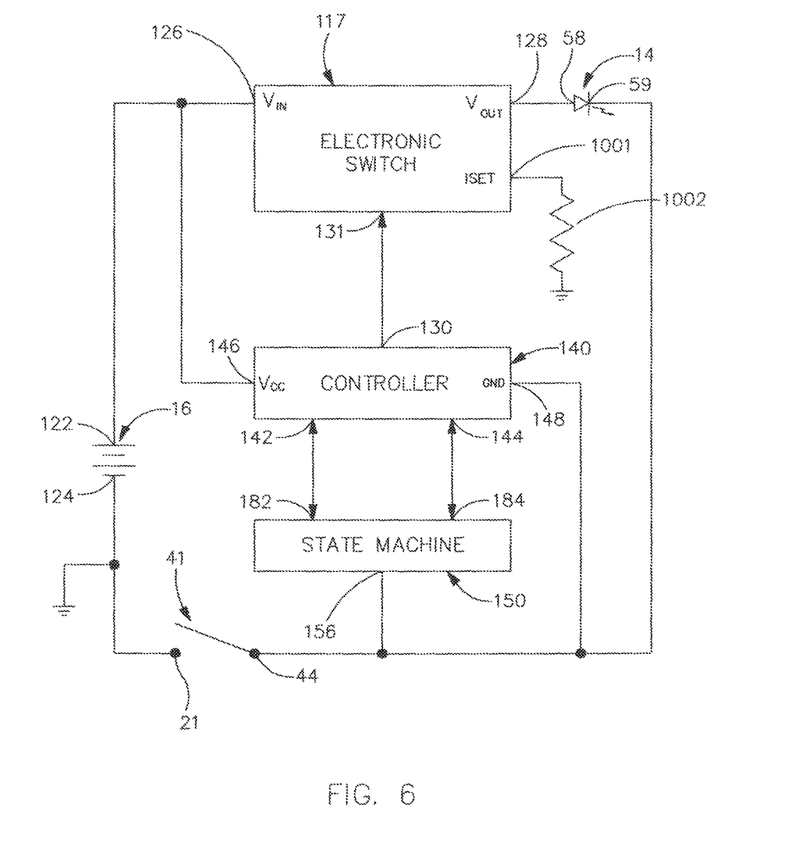
FIG. 6 is an embodiment of a circuit diagram for the flashlight of FIG. 1.

Lighting module 40 together with the retaining collar 42, barrel 12, and head assembly 20 form a mechanical power switch corresponding to mechanical power switch 41 shown in the circuit diagram of FIG. 6. The contacts of the mechanical power switch 41 comprise the contact 21 of the annular region 24 and the heat sink housing 44 of the lighting module 40. In FIG. 3, the flashlight 10 is shown in the OFF condition (i.e., switch 41 is open). To close switch 41 and turn flashlight 10 ON, the head assembly is rotated in the counterclockwise direction relative to the barrel so that the head assembly 20 is axially translated away from the barrel and the heat sink housing 44 comes into contact with contact 21, thereby closing the circuit of the flashlight 10 and turning the flashlight 10 ON. To turn flashlight 10 OFF, the head assembly is rotated in the opposite, clockwise, direction so that the head assembly is axially translated toward the barrel and pushes the heat sink housing 44 of lighting module 40 out of contact with contact 21 of the barrel 12.

Figure 4:
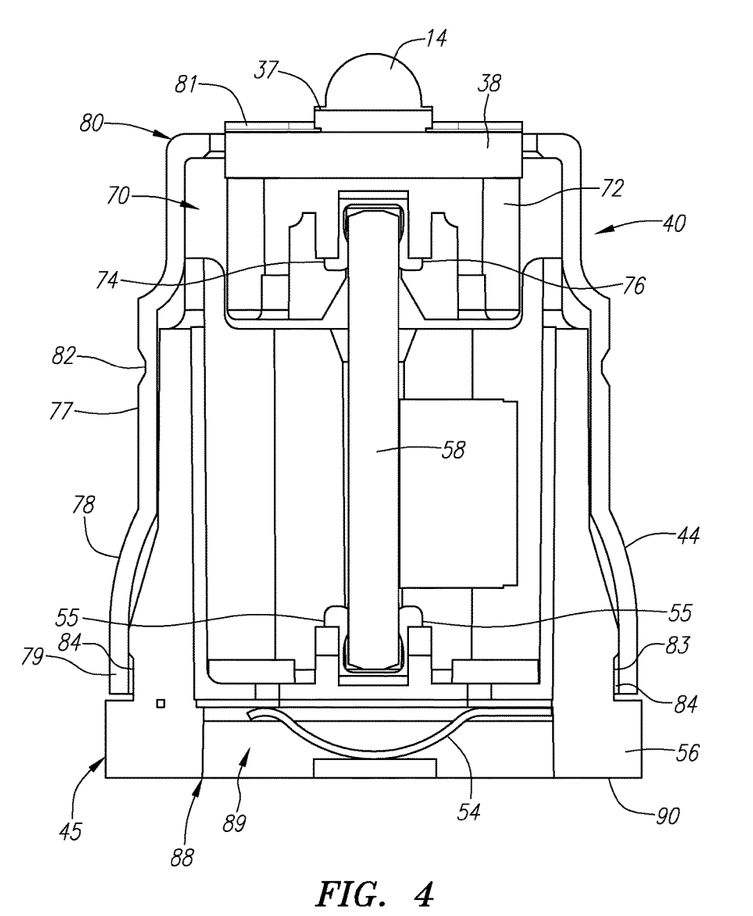
FIG. 4 is a cross-sectional view of the LED module of the flashlight of FIG. 1.

FIG. 4 is a cross-sectional view of the lighting or LED module 40 in isolation. The LED module 40 of the present embodiment includes an LED 37 as light source 14, a first circuit board 38, a lower assembly 45 formed by compressible positive contact 54 and a lower insulator 56, a second circuit board 58, an upper assembly 70 formed by an upper insulator 72 and an upper positive contact 74 and an upper negative contact (not shown), and a heat sink 80 formed by the outer heat sink housing 44 and a contact ring 81, which are preferably made out of metal.

For redundancy, the compressible positive contact 54 preferably includes two clips 55 for making electrical contact with second circuit board 58, one of the clips 55 being displaced before the page in the cross-sectional view provided in FIG. 4. The second circuit board 58 is in electrical contact with upper positive contact 74 and an upper negative or ground contact, which are preferably solder connected to the bottom side of the first circuit board 38. For redundancy, the upper positive contact 74 preferably includes two clips 76, one of which is displaced before the page in the view provided in FIG. 4. The upper ground contact also includes two clips 76 for making electrical contact with the second circuit board 58, one of which is displaced behind the clip 76 of the upper positive contact shown in FIG. 4 and one of which is displaced before the page in the view provided in FIG. 4. The upper positive contact 74 is in electrical communication with the positive electrode of LED 37 via first circuit board 38 and the upper ground contact is in electrical communication with the heat sink 80 via the first circuit board 38.

The LED 37 and the heat sink 80 are affixed to the first circuit board 38, preferably via a solder connection. The first circuit board 38, which preferably is a metal clad circuit board having a plurality of thermally conductive layers connected by thermal vias, promotes the rapid and efficient transfer of heat from the LED 37 to the heat sink 80.

The LED 37 can be any light emitting diode that can be soldered to a printed circuit board. Preferably the LED 37 can be soldered to the first circuit board 38 using a screen applied solder paste and a reflow oven. More preferably, the LED 37 is the LUXEON® Rebel product commercially available from Philips Lumileds Lighting Company, LLC.

The second circuit board 58 includes the circuitry for operating flashlight 10 and making it function as a multi-mode flashlight.

The lower assembly 45 is preferably formed by co-molding compressible positive contact 54 and a lower insulator 56 together. Likewise, upper assembly 70 is preferably formed by co-molding upper insulator 72 and an upper positive contact 74 and an upper negative contact together. Thus, the upper and lower insulator are preferably formed from an injection moldable plastic with suitable structural and thermal qualities for the application.

The upper positive and negative contacts of the upper assembly 70 are soldered to the bottom of the first circuit board 38, the front side of which is in turn soldered to contact ring 81, which can be press fit and/or soldered to heat sink housing 44. Thus, the upper assembly 70 is firmly held within heat sink housing 44 in the present embodiment. Further, the circumference of heat sink housing 44 is crimped into an annular recess 83 of the lower insulator 56. The crimping of heat sink housing 44 into annular recess 83 holds lower insulator 56 and hence the lower assembly 45 within heat sink housing 44.

During manufacture, prior to the lower insulator 56 being coupled to the heat sink housing 44 with the second circuit board 58 positioned therebetween, a potting material may be provided into the lower insulator 56. Accordingly, the second circuit board 58 may be inserted into the potting material as the lower insulator 56 is coupled to the heat sink housing 44. This potting material may serve to protect the second circuit board 58 if the flashlight 10 is dropped later when in use. The potting material may comprise an epoxy resin or other suitable material. The lower insulator 56 may be filled halfway with the potting material, but other volumes of potting material may be used.

When flashlight 10 is in the ON state, the heat sink housing 44 thermally and electrically couples the light source 14 and the barrel 12. In addition, the heat sink housing 44 electrically couples the ground path of the second circuit board 58 to the barrel 12. The heat sink housing 44 therefore acts as the negative, or ground, contact for the lighting module 40. Further, by arranging the heat sink housing 44 as shown in FIG. 2 so that it is in good thermal contact with the barrel 12 when the flashlight 10 is ON, heat that is generated by the light source 14 is efficiently absorbed and/or dissipated by the first circuit board 38 to contact ring 81, the heat sink housing 44 and finally barrel 12. Thus flashlight 10 is able to effectively protect the light source 14 from being damaged due to heat. Preferably, the heat sink housing 44 is made from a good electrical and thermal conductor, such as aluminum.

The heat sink housing 44 is formed so that it flares in a region 78 toward the back or bottom of the LED module 40 from a first region 77 having a first diameter to a second region 79 having a second, larger diameter. The diameter of the first region 77 is sized so that it can fit within the annular lip 24 without coming in contact with the annular lip 24. The outer diameter of the lower insulator 56 is sized so that there is little or no play in the radial direction between the inner wall of the barrel and the lower insulator 56. In this way, the heat sink housing 44 can be kept from contacting the barrel 12 except when LED module 40 is pushed far enough forward within barrel 12 so that the flared region 78 of the heat sink housing 44 comes into contact with the contact 21 of the annular lip 24 of barrel 12.

Figure 5A:
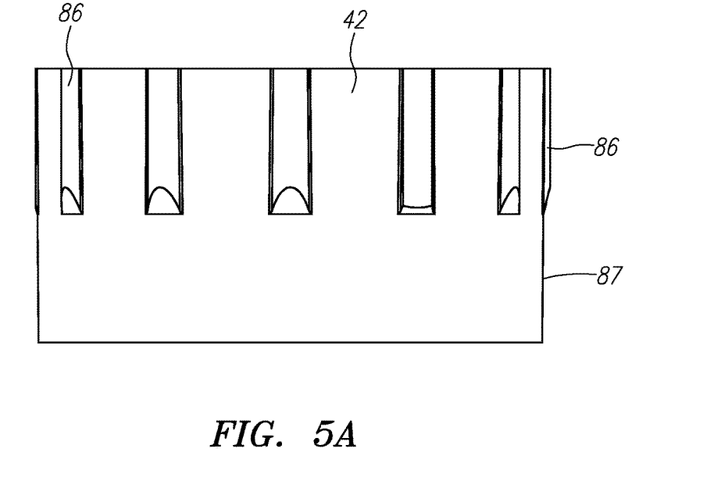
FIG. 5A is a side view of a retaining collar.
Figure 5B:
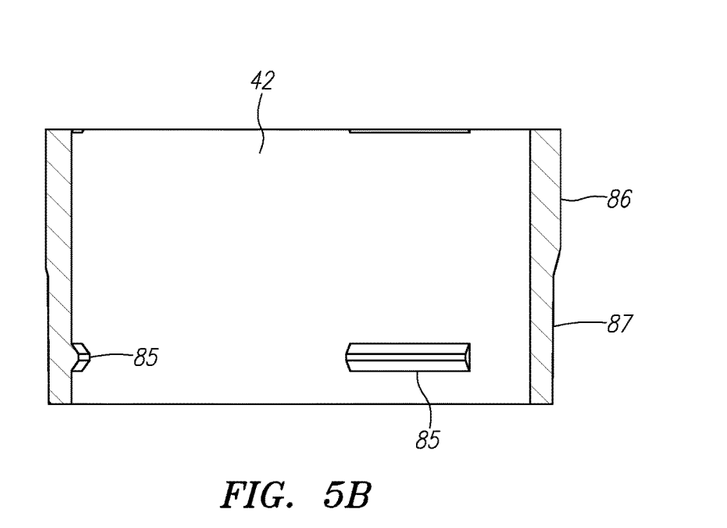
FIG. 5B is a longitudinal cross-sectional view through the retaining collar.

The outer surface of the heat sink housing 44 also includes an annular recess 82 in the region 77 of the first diameter. The annular recess 82 is generally perpendicular to the axis of the heat sink and the barrel 12. In addition, the annular recess 82 is positioned to receive locking tabs 85 (see FIG. 5) of retaining collar 42 when the LED module 40 is mounted within the barrel 12.

The flared region 78 of the heat sink housing 44 is preferably shaped to mate with contact 21 along as much surface area as possible to facilitate electrical and thermal communication between the LED module 40 and the barrel 12. The flared region 78 of the heat sink housing 44 is also sized so that once disposed in the barrel 12, the axial movement of the heat sink housing 44, and, consequently, the LED module 40, in the forward direction will be limited by the annular lip 24 of the barrel 12.

The lower insulator 56 includes at its back face 88 a recess 89, which is surrounded by an annular shoulder 90 so that the recess is centrally located. The recess 89 is dimensioned to be deeper than the height of the center electrode of battery 16. However, as shown in FIGS. 2 and 3, when the forward most battery 16 is urged forward against the back face 88 of the lower insulator 56, the center electrode of battery 16 engages with the compressible positive contact 54. In this way, the LED module 40 provides a simple configuration that enhances the electrical coupling between components even when the flashlight is jarred or dropped, which may cause the battery or batteries 16 to suddenly displace axially within the barrel 12. Further, because the compressible positive contact 54 may absorb impact stresses due to, for example, mishandling and recess 89 is deeper than the center electrode of the forward most battery 16, the battery's center electrode and the electronics of the flashlight provided on second circuit board 58 are well protected from physical damage during use of the flashlight 10.

Also, because the compressible positive contact 54 is disposed forward of the shoulder 90 of back face 88, if a battery or batteries 16 are inserted backwards into the barrel 12 so that their case electrodes are directed forward, no electrical coupling with compressible positive contact 54 is formed. Accordingly, the configuration of the LED module 40 and its arrangement within barrel 12 will help to protect the flashlight's electronics from being affected or damaged by reverse current flow. In another embodiment, the electronics of flashlight 10 are protected from reverse current flow by the use of a diode included in the electrical circuit of the flashlight.

Referring to FIGS. 2 and 3, the lighting module 40 is disposed generally in the forward end of the barrel 12. Absent further assembly, the lighting module 40 is urged forward by the action of the conductive spring member 32 on batteries 16 until the flared region 78 of the heat sink housing 44 comes into contact with the annular lip 24 of the barrel 12. The retaining collar 42 attaches to the heat sink housing 44 of the lighting module 40 and, among other things, limits axial movement of the lighting module 40 in the rearward direction beyond a predetermined distance. The retaining collar 42 attaches to the lighting module 40 at the annular recess 82 of the heat sink housing 44.

Referring to FIGS. 3, 5A and 5B, the retaining collar 42 includes circumferential locking tabs 85, which project inwardly from the inner surface of the retaining collar 42, and ribs 86, which project outwardly from the outer surface of the retaining collar 42. Referring to FIG. 3, each of the locking tabs 85 is sized to fit into the annular recess 82 on the exterior of the heat sink housing 44. A plurality of ribs 86 are preferable spaced equally around the exterior circumference of the retaining collar 42 so as to generally extend in the axial direction of the retaining collar 42. The ribs 86 preferably extend from the front of the retaining collar to slightly over half the axial length of retaining collar 42. The ribs 86 are dimensioned so as to limit the amount of radial play between the forward end of the lighting module 40 and the inner diameter of the barrel 12 to a desirable amount. The ribs 86 are also preferably dimensioned to project outwardly from retaining collar 42 by the same or a greater distance than the locking tabs 85 project inwardly. By only having the ribs extend to about the middle of the of the retaining collar 42, the aft end 87 of the retaining collar 42 can expand sufficiently over the outer surface of the heat sink housing 44 within the barrel 12 until circumferential locking tabs 85 snap into annular recess 82 (see FIG. 3). Once the circumferential locking tabs 85 are snapped into annular recess 82, the rearward movement of the lighting module 40 is confined by the annular lip 24. Thus, by securing the retaining collar 42 to the lighting module 40, which is disposed in the barrel 12, the retaining collar 42 keeps the lighting module 40 from falling to the rear of barrel 12, and potentially out the back end of the flashlight 10, in the absence of batteries 16 being installed in the flashlight 10. In a preferred embodiment, the retaining collar 42 is made from an insulator such as, for example, plastic.

Referring to FIG. 3, the head assembly 20 is disposed on the forward end of barrel 12. The head assembly 20 includes a face cap 102, a lens 104, a reflector 106, and a head 108. The reflector 106 and the lens 104 are rigidly held in place by the face cap 102, which is threadably coupled to the head 108. The head 108 includes threads 112 formed on its inside diameter that engage with the forward threads 18 of the barrel 12. Arranged this way, the reflector 106 may be displaced in the axial direction of the flashlight 10 by rotating the head assembly 20 relative to the barrel 12.

In a preferred implementation of the illustrated embodiment, the tail cap 28, the barrel 12, the face cap 102 and the head 108, generally forming the external surfaces of the flashlight 10, are manufactured from aircraft quality, heat treated aluminum, which may be selectively anodized. The non-conductive components are preferably made from polyester plastic or other suitable material for insulation and heat resistance.

Referring back to FIG. 3, the reflective profile 118 of the reflector 106 is preferably a segment of a computer-generated optimized parabola that is metallized to ensure high precision optics. Optionally, the reflective profile 118 may include an electroformed nickel substrate for heat resistance.

Preferably the profile 118 is defined by a parabola having a focal length of less than 0.080 inches, and more preferably between 0.020-0.050 inches. Further, the distance between the vertex of the parabola defining the profile 118 and the aft opening of the reflector 118 is preferably 0.080-0.130 inches, more preferably 0.105-0.115 inches. The opening of the forward end of the reflector 106 preferably has a diameter of 0.7-0.8 inches, more preferably 0.741-0.743 inches, and the opening of the aft end of the reflector 106 preferably has a diameter of 0.2-0.3 inches, more preferably 0.240 to 0.250 inches. Further, the ratio between the distance from the vertex to the opening of the aft end of the reflector 106 and the focal length is preferably in the range of 1.5:1 and 6.5:1, more preferably 3.0:1 to 3.4:1. Moreover, the ratio between the distance from the vertex to the opening of the forward end of the reflector 106 and the focal length is preferably in the range of 20:1 and 40:1, more preferably 26:1 to 31:1.

In the illustrated flashlight 10, the reflector 106 may be selectively moved in the axial direction relative to the light source 14. By rotating the head assembly 20 relative to the barrel 12 the head assembly 20 travels along the forward threads 18 of the barrel 12 and causes the reflector 106 to axially displace relative to the light source 14. By varying the axial position of the reflector 106 relative to the light source 14, the flashlight 10 varies the dispersion of light produced by the light source 14. In this way, the flashlight 10 can be adjusted between spot and flood lighting.

Although the illustrated embodiment employs mating threads to enable the movement of the reflector 106 axially relative to the light source 14, in other embodiments other mechanisms may be employed to achieve an adjustable focus feature.

Further, because the head assembly 20 of the illustrated embodiment does not form part of the electrical circuit, it may be completely removed from the barrel 12 of the flashlight 10 so that the tail cap 28 end of the flashlight 10 may be inserted into the head assembly 20 and the flashlight used in a "candle mode."

Referring back to FIG. 3, although the embodiment disclosed herein illustrates a substantially planar lens 104, the flashlight 10 may instead include a lens that has curved surfaces to further improve the optical performance of the flashlight 10. For example, the lens may include a biconvex profile or a plano-convex profile in the whole or part of the lens surface.

A sealing element, such as an O-ring 75, may also be incorporated at the interface between the face cap 102 and the lens 104, the face cap 102 and the head 108, and the head 108 and the barrel 12 to provide a watertight seal.

The electrical circuit of flashlight 10 will now be described. Referring to FIGS. 2-4, the electrical circuit of flashlight 10 is shown in the open or OFF position. The electrical circuit is closed, or is in the ON position, when the head assembly 20 is rotated to sufficiently translate the lighting module 40 in the forward direction so that the flared region 78 of the heat sink housing 44 electrically couples with the contact 21 of the barrel 12. Once the circuit is closed, electrical energy is conducted from the rear battery 16 through its center contact which is in connection with the case electrode of the battery 16 disposed forward thereof. Electrical energy is then conducted from the forward-most battery 16 to the compressible positive contact 54 of the lighting module 40. The electrical energy is then selectively conducted through the electronics on the second circuit board 58 through the upper positive contact 74 and to the positive electrode of the light source 14 via the first circuit board 38. After passing through the light source 14, the electrical energy emerges through the negative electrode of the light source 14 which is electrically coupled to heat sink 80 via the first circuit board 38. The heat sink housing 44 of heat sink 80 is electrically coupled to the contact 21 of barrel 12. The barrel 12 is coupled to the tail cap 28, which is in electrical contact with the conductive spring member 32. Finally, the conductive spring member 32 of the tail cap assembly 30 completes the circuit by electrically coupling with the case electrode of the rearmost battery. In this manner, a main power circuit is formed to provide electrical energy to illuminate the light source 14.

In the present embodiment, a parallel ground path is also formed from the second circuit board 58 to the heat sink housing 44 through upper ground contacts attached to the upper end of the second circuit board 58 and the first printed circuit board 38, which is in turn in electrical contact with the heat sink 80. Thus, the controller provided on the second circuit board 58 may remain powered at all times when the mechanical power switch 41 is closed, even if the electronics on the second circuit board 58 modulate the light source 14 on and off.

Referring to FIG. 3, to open the electrical circuit of flashlight 10, the user may twist or rotate the head assembly 20 to translate the lighting module 40 in the aft direction until the flared region 78 of the heat sink housing 44 separates from the contact 21 of the barrel 12.

Although the illustrated embodiment of flashlight 10 is turned ON by causing the head assembly 20 to move away from the barrel and turned OFF by causing the head assembly 20 to axially translate toward the barrel 12, through a simple reconfiguration of lighting module 40, the retaining collar 42, and the annular lip 21, the flashlight 10 could be made to operate in the inverse order. In other words, so that axial movement of the head assembly 20 away from the barrel 12 would cause the flashlight to turn OFF and axial movement of the head assembly 20 toward the barrel 12 would cause it to turn ON.

Further, although a rotating type mechanical power switch that opens and closes the electrical circuit at the barrel/heat sink housing has been described, the electrical circuit may be closed or opened at other locations. Moreover, although a rotating type mechanical power switch has been described, the various aspects of the invention as described herein are not limited by the type of mechanical power switch employed. Other suitable mechanical power switches, including, for example, push-button and sliding type mechanical power switches may also be employed.

The multi-mode operation of flashlight 10 will now be described. The flashlight 10 is preferably provided with a plurality of modes of operation. In the embodiment described below, the flashlight 10 is provided with four modes of operation. Each mode of operation allows the flashlight 10 to perform one of four specific features of the flashlight 10, such as, for example, normal operation, power save, blink, or SOS. When the flashlight 10 is initially turned ON, or if flashlight 10 has been turned OFF for more than a predetermined period of time, the flashlight 10 will automatically operate in a first, default mode of operation. While the flashlight 10 is in the first operating mode, if it is turned OFF for a period of time, which is less than or equal to a predetermined period of time, and then turned back ON, the flashlight 10 will change to a second operating mode. While the flashlight 10 is in the second operating mode, if it is again turned OFF for a period of time, which is less than or equal to a predetermined period of time, and then turned back ON, the flashlight 10 will change to a third operating mode. In the same manner, while the flashlight 10 is in the third operating mode, if it is again turned OFF for another period of time, which is less than or equal to a predetermined period of time, and then turned back ON, the flashlight 10 will change to a fourth operating mode.

In the present embodiment, the predetermined period of time is set to be equal to one and a half (1.5) seconds, which is a relatively short period of time, but more than sufficient for an operator of flashlight 10 to manipulate the head assembly 20 to turn OFF flashlight 10 and then turn flashlight 10 back ON. In other embodiments, a shorter or longer period may be desirable. However, the predetermined period is preferably less than 3 seconds, otherwise flashlight 10 will have to sit idle too long for the average user before it can be returned to its default mode of operation without indexing through all of the modes of operation.

In the embodiment described above, while the flashlight 10 is in the fourth operating mode, if it is turned OFF for a short period of time and then turned back ON, the flashlight 10 will change back to the first operating mode. Yet in an embodiment with more than four modes of operation, if the flashlight 10 is turned OFF for a period of time that is less than or equal to the predetermined period of time and then turned back ON, the flashlight 10 will change to a fifth operating mode, and so on. Regardless of the number of included modes of operation, e.g., 2 to N, the flashlight 10 preferably cycles back to the first mode of operation after reaching the last mode programmed into the electronics of the flashlight.

Preferably, the first operating mode is a normal mode in which the light source 14 of flashlight 10 is provided with maximum power as long as the mechanical power switch 41 remains closed. The second operating mode in the present embodiment is a power saving mode in which the light source 14 of flashlight 10 is operated at reduced power (e.g., 50% power) in order to extend the life of the batteries. The third operating mode of the present embodiment is a blink mode in which the light source 14 is flashed on and off at a predefined frequency or preprogrammed frequency pattern that is perceptible to the human eye. The fourth operating mode is an SOS mode in which the light source 14 is automatically flashed to signal SOS in Morse code.

FIG. 6 is one embodiment of a circuit diagram for the flashlight 10 of FIG. 1. In the embodiment of FIG. 6, the circuit for the flashlight 10 of FIG. 1 includes batteries 16, electronic switch 117, light source 14, mechanical power switch 41, controller 140, and state machine 150. In the illustrated embodiment, the light source 14 is an LED. In other embodiments, the light source 14 may be incandescent lamp or arc lamp.

The mechanical power switch 41 in the present embodiment corresponds to the mechanical power switch formed by lighting module 40, retaining collar 42, barrel 12, and head assembly 20. As illustrated, the contacts of mechanical power switch 41 in the present embodiment comprise heat sink housing 44 and contact 21 of barrel 12.

The controller 140 is preferably a microcontroller, such as, for example, ATtiny13 which is an 8-bit microcontroller manufactured by Atmel Corporation of San Jose, Calif. In other embodiments, the controller 140 may be a microprocessor, an ASIC, or discrete components.

In the present embodiment, the batteries 16 are arranged electrically in series so that there is a positive electrode 122 and a negative electrode 124, with the positive electrode 122 corresponding to the positive electrode of the front-most battery and the negative electrode 124 corresponding to the negative electrode of the rear-most battery. In other embodiments, the batteries may be arranged electrically in parallel.

The electronic switch 117 has a voltage input 126, a voltage output 128 and a duty cycle input 131. The light source 14 has a first, positive electrode 58 and a second, negative electrode 59. The mechanical power switch 41 includes heat sink housing 44 as a first, contact and contact 21 of barrel 12 as a second contact. The controller 140 has a power input 146, a ground 148, a plurality of data ports 142, 144 and a duty cycle output 130. The state machine 150 has a plurality of state ports 182, 184 and a ground connection 156.

In the present embodiment, the positive electrode 122 of the batteries 16 is electrically coupled to the voltage input 126 of the electronic switch 117 and the power supply input 146 of the controller 140. The voltage output 128 of the electronic switch 117 is electrically coupled to the first, positive electrode 58 of the light source 14. The second, negative electrode 59 of the light source 14 is electrically coupled to the first contact (heat sink housing 44 in the present embodiment) of the mechanical power switch 41. Therefore, when the second contact (contact 21 of barrel 12) of mechanical power switch 41 is brought into contact with the first contact, so that the mechanical switch 41 is closed, a first closed circuit loop (corresponding to the main power circuit of flashlight 10) is formed in which electric current flows from the batteries 16, through the electronic switch 117, the light source 14, and the mechanical power switch 41.

The electronic switch 117 and the light source 14 are considered the load of the first closed circuit loop. When the switch 41 is open, the load is electrically disconnected from the batteries 16.

In one embodiment, the electronic switch 117 is a power transistor, preferably a p-channel MOSFET, since switching is being performed on the high-side in the circuit of the present embodiment. In an embodiment in which switching is performed on the low-side of the circuit, then an n-channel MOSFET would be desirable. In still another embodiment, electronic switch 117 may be a load switch including a current-limited p-channel MOSFET, such as the FPF 2165 manufactured by Fairchild Semiconductor. A current-limited load switch may provide downstream protection to systems and loads which may encounter large current conditions. For example, it may be desirable to use such a load switch if the flashlight embodiment includes three or more batteries 16 in series.

In the present embodiment, the positive electrode 122 of the batteries 16 is also connected to the power input 146 of the controller 140. The ground 148 of the controller 140 connects to the first contact of the mechanical power switch 41. Therefore, when mechanical power switch 41 is closed, a second closed circuit loop is also formed in which an electric current flows from the batteries 16, through the controller 140, and the mechanical power switch 41. The controller 140 is considered the load of the second closed circuit loop. When the mechanical power switch 41 is open, the load of the second loop, namely the controller, is electrically disconnected from the batteries 16.

Accordingly, as shown in FIG. 6, the main power circuit includes a mechanical power switch 41 and an electronic switch 117 disposed electrically in series with the light source 14. Further, controller 140 is electrically coupled in series with the mechanical power switch 41 so that when the mechanical power switch 41 is opened, the controller 140 is not powered by the batteries 16. The controller 140 includes an output 130 for providing a control signal for controlling the opening and closing of the electronic switch 117. The controller is also configured to control the electronic switch 117 in a manner to provide at least two modes of operation as discussed below.

The state machine 150 comprises a memory mechanism for temporarily storing a mode of operation. It includes at least one output (e.g., outputs 182 and 184) coupled to the controller 140 for communicating at least one output signal to the controller 140. As discussed in more detail below, the controller 140 is configured to determine the mode of operation based on the at least one output signal from the state machine 150. The controller 140 also writes a new mode of operation to the state machine 150 following power up.

In the present embodiment, the electronic switch 117, the controller 140, and the state machine 150 all reside on second circuit board 58 of the lighting module 40. In other embodiments, they may reside on separate circuit boards, and may reside in locations other than the lighting module 40.

In the present embodiment, the mechanical power switch 41 is used as the user interface for the multi-mode flashlight 10 in addition to serving as the main power switch. Accordingly, the controller 140 is required to interpret the actuations of the mechanical power switch 41 as inputs from the user and change the operational mode of flashlight 10 accordingly.

Because the load 117, 14, 140, and in particular the controller 140, is un-powered every time the switch 41 is in the OFF position, when switch 41 is once again closed to turn the flashlight 10 ON, the controller 140 has no intrinsic way of knowing what state or mode the flashlight 10 was in the last time the mechanical power switch 41 was closed. Accordingly, the state machine 150 is used to provide state information of the flashlight 10 to the controller 140 every time flashlight 10 is turned ON by mechanical power switch 41.

Figure 7:
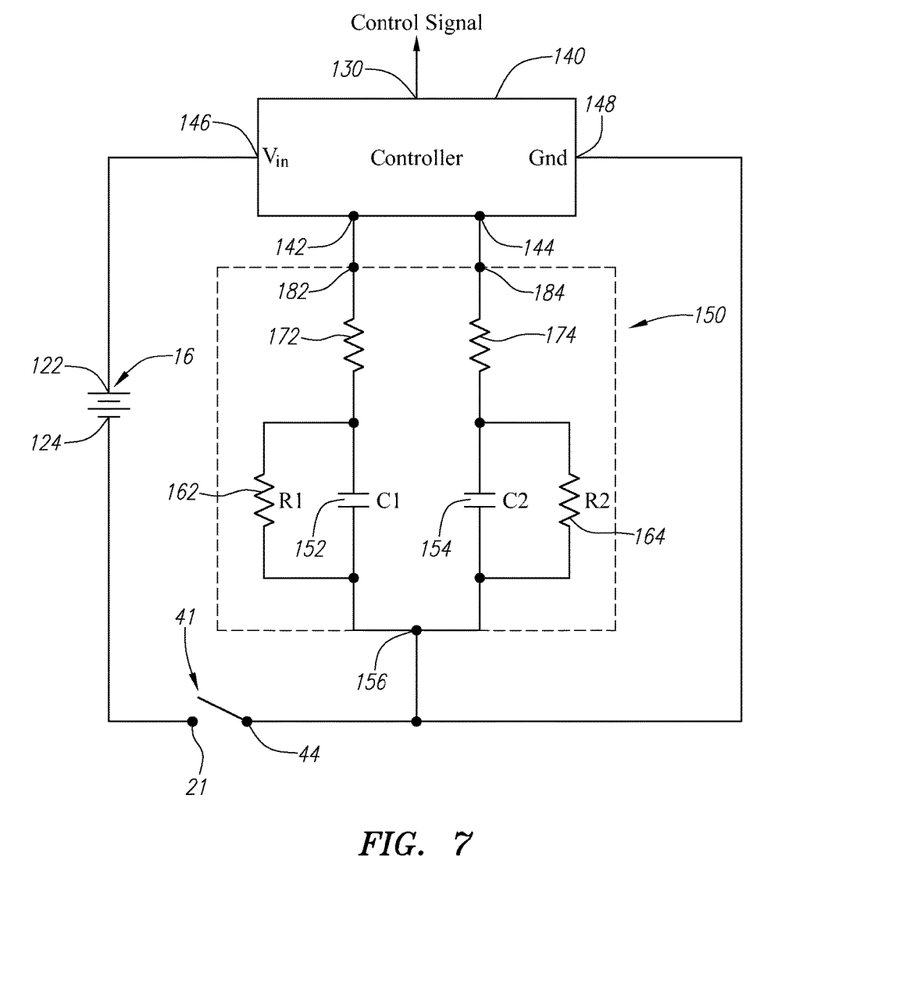
FIG. 7 is a circuit diagram according to one embodiment of a state machine for the flashlight of FIG. 1.

FIG. 7 is a circuit diagram showing one embodiment of a state machine 150 for the flashlight 10 of FIG. 1. In the embodiment of FIG. 7, two RC timing circuits are used. One is shown on the left of state machine 150 and the other is shown on the right of state machine 150. The left RC circuit includes a capacitor 152 electrically coupled in parallel to a bleed off resistor 162. A charging resistor 172 is interposed between the parallel RC circuit 152, 162 and the state port 182 of the state machine 150. The resistor 172 is also connected in series with the RC circuit 152, 162. The state port 182 is electrically coupled to the data port 142 of the controller 140.

The configuration of the right RC circuit is similar to the left RC circuit. A capacitor 154 is electrically coupled in parallel to a bleed off resistor 164. A charging resistor 174 is electrically interposed between the parallel RC circuit 154, 164 and the state port 184 and is in series with the RC circuit 154, 164. The state port 184 is further coupled to the data port 144 of the controller 140. Both RC circuits 152, 162 and 154, 164 are coupled to ground connection 156, which is further coupled to the first contact (heat sink housing 44) of the mechanical power switch 41.

The capacitance of capacitors 152, 154 and the resistors 162, 164 are preferably selected so as to provide a time constant of greater than about 3 seconds and less than about 4 seconds. For example, in one embodiment, the capacitance of the capacitors 152, 154 is set at 2.2 uF, and the resistance of the bleed off resistors 162, 164 is set at 1.5 MΩ. As a result, the nominal time constant (T) for each parallel RC circuit is equal to 3.3 seconds (2.2 uF×1.5 MΩ). This time constant represents the time for each of the capacitors 152, 154 to decay to 37% of their charged voltage value. Thus, if the fully charged voltage on each of the capacitors 152, 154 is three (3) volts before the flashlight 10 is turned OFF, the voltage on each of the capacitors 152, 154 would be approximately 1.11 volts after the time constant of 3.3 seconds is elapsed. By contrast, the resistance of charging resistors 172, 174 is preferably set very low (e.g. 10 kΩ) so that the time constants (T) of the RC circuits 172, 152 and 174, 154 is very short (e.g. 22 ms), so that the capacitors 152 and 154 can be fully charged by controller 140 almost instantaneously (e.g., 110 ms in the present embodiment). In general the resistance of charging resistors 172, 174 should be set so that capacitors 152, 154 are charged in a period of time that is substantially shorter than it would take a user to turn ON and then OFF flashlight 10 during normal operation. In general, the bleed off resistor preferably has a resistance of at least two orders of magnitude greater than the charge resistor.

When the mechanical power switch 41 is opened or in the OFF position, the voltage stored on capacitors 152, 154 will decay at a given rate that is dependent on the value of the capacitor 152, 154 and bleed off resistors 162, 164, respectively. When the mechanical power switch 41 is closed so that the flashlight 10 is turned back ON, there will be a residual voltage remaining across each of capacitors 152, 154. The residual voltage on each capacitor 152, 154 is measured by the controller 140 upon power up when the mechanical power switch 41 is closed. The controller 140 interprets the residual voltage remaining on each capacitor 152, 154 as an ON or an OFF (i.e., as a 1 or a 0), depending on the voltage it measures for each capacitor. Based on the interpreted state of each capacitor, the controller 140 determines and implements the appropriate mode of operation for flashlight 10. Table 1 below, summarizes each operational mode the controller 140 of the present embodiment is configured to implement based on the state of each capacitor 152, 154 at the time the controller 140 is powered up. In other embodiments, other modes may be included or the modes may be associated with different states of capacitors 152, 154.

TABLE 1

Summary of operating modes and voltage values on capacitors C1 and C2

| Mode | Voltage Value Present At Power Turn ON (current mode) | | Voltage Value Set After Power Turn ON (next mode) | |
| --- | --- | --- | --- | --- |
| | C1 (152) | C2 (154) | C1 (152) | C2 (154) |
| Normal | 0 | 0 | 0 | 1 |
| Power Save | 0 | 1 | 1 | 0 |
| Blink | 1 | 0 | 1 | 1 |
| SOS | 1 | 1 | 0 | 0 |

As can be seen from the foregoing, controller 140 can readily use the residual voltage stored on capacitors 152, 154 to determine the operational mode of the flashlight 10 each time the controller 140 is powered up. Further, as shown in Table 1, using two parallel RC circuits (152, 162 and 154, 164) allows four modes of operation. More modes can be implemented by using more parallel RC circuits. Because each capacitor can be used to represent two logic values, the number of available operating modes can be $2^n$, wherein n is the number of parallel RC circuits. For example, one RC circuit yields a maximum of two operating modes, two RC circuits yields a maximum of four operating modes, and three RC circuits yields a maximum of eight operating modes, etc.

Beneficially, if the mechanical power switch 41 is left open or in the OFF position for a sufficient period of time, the residual voltage across capacitors 152, 154 will decay to zero (0) volts, regardless of their original state. As a result, when the controller 140 is turned on again, the controller 140 will measure no voltage on either capacitor 152 or 154 and, as shown in Table 1, put the flashlight 10 into the first or "Normal" mode of operation.

How controller 140 interprets the residual voltage remaining on each capacitor 152, 154 as being in the ON or OFF state (i.e., as a 1 or a 0) is now explained. In one embodiment, the residual voltage remaining on each capacitors 152 and 154 at power up is measured by an analog-to-digital converter (ADC) which is embedded in the controller 140. The measured voltages are then compared against a voltage stored in non-volatile memory. If the measured voltage is equal to or greater than the voltage stored in memory for the capacitor, then the capacitor is treated as being in the ON state, whereas if the measured voltage for a capacitor is less than the stored voltage for the capacitor, it is treated as being in the OFF state. The voltage stored in memory for each capacitor 152, 154 may, for example, correspond to what the residual voltage across each capacitor should be after a predetermined time threshold has lapsed from the opening of mechanical power switch 41, for example, 1.5 seconds. This means that if the user wants to switch from the normal mode to power save mode, he/she would be able to turn the flashlight 10 off for up to 1.5 seconds before turning it back on, and the flashlight will change to the power save mode. Any longer time would cause the flashlight to return to the normal mode.

While the decay voltage value stored in non-volatile memory for each capacitor 152, 154 may be calculated based on the decay formula $V_c = Ee^{-t/T}$, a more preferred approach is to empirically determine the voltage stored on each capacitor 152, 154 after the desired predetermined period has lapsed and then store the residual value for that capacitor in non-volatile memory for the future reference of controller 140.

Because the manufacturing tolerances for capacitors is relatively high, the actual capacitance of a capacitor can vary significantly from its nominal value, as well as from the actual capacitance of another capacitor having the same nominal capacitance. As a result, capacitors with the same nominal capacitance can discharge at substantially different rates during bleed off, with higher capacitance capacitors taking longer to drain than lower capacitance capacitors. In order to remove such variability from the system, in a preferred embodiment, a calibration procedure is performed during manufacturing to normalize or calibrate the discharge rate of each capacitor 152, 154. A detailed description of an embodiment of the calibration procedure is described below.

Once second circuit board 58 is manufactured, the board is connected to an LED to simulate the load of the flashlight 10 while the relevant pin of the controller is driven low to provide a calibration signal to the controller. The controller and load are then powered and both capacitors 152, 154 fully charged. Power to the controller 140 and LED is then cut off for an exact interval, for example, 1.5 seconds. After the set time interval has passed, the circuit is powered up and the voltage value on each capacitors 152, 154 is precisely measured by the controller 140, which then stores the measured voltage values for each capacitor in non-volatile memory, such as an EEPROM embedded in the controller 140. The voltage value stored in non-volatile memory for each capacitors 152, 154 now precisely reflects the decay voltage threshold for each capacitor after the predetermined period (e.g., 1.5 seconds) has lapsed. This procedure thus removes the effects of capacitor tolerance that could affect the on/off timing of the multiple flashlight modes.

The predetermined period is preferably greater than or equal to 0.75 second and less than or equal to 3.0 seconds. More preferably, the predetermined period is greater than or equal to 1.0 second and less than or equal to 2.0 seconds. Still more preferably, the predetermined period is 1.5 seconds.

The operation of the flashlight 10 between different modes will now be described in connection with Table 1 and FIG. 7. When the flashlight 10 is initially turned ON or turned ON after 1.5 seconds has lapsed, the flashlight 10 is operated in a normal mode. The controller 140 then charges capacitor C2 154 through the charging resistor 174 by pulling up the data port 144. For example, if the flashlight includes 3 batteries in series, the voltage across capacitor 152 will be approximately 4.5 volts, whereas if the flashlight 10 only includes two batteries then the voltage across capacitor 154 will be approximately 3.0 volts. Simultaneously, the controller 10 discharges capacitor C1 152 by pulling down the data port 142 and consequently, the voltage across capacitor C1 152 will be approaching 0 volts. As shown in the two right-most columns of Table 1, the logic value of capacitor C1 152 is set to 0 and the logic value of capacitor C2 154 is set to 1. In the illustrated embodiment, the value of charging resistors 172, 174 are preferably set at 10 KΩ or less so that capacitors 152, 154 can be fully charged in about 50 ms or less.

While the flashlight 10 is in the Normal mode, if it is turned OFF for less than, for example, 1.5 seconds and then turned back ON, the voltage value measured at data port 142 will be approaching 0 volts and the voltage value measured at data port 144 will be higher than the 1.5 second voltage threshold value stored in the non-volatile memory. The controller 140 compares the voltage values presented at data ports 142, 144 to the corresponding values in memory and determines that the correct mode of operation is now the second mode, which is a power save mode. The controller 140 then charges capacitor C1 152 and discharges capacitor C2 154 using the method described in the normal mode. As shown in Table 1, the logic value of capacitor C1 152 is set to 1 and the logic value of capacitor C2 154 is set to 0.

While the flashlight 10 is in the power save mode, if it is turned OFF for less than, for example, 1.5 seconds and then turned back ON, the voltage value measured at data port 144 will be approaching 0 volts and the voltage value measured at data port 142 will be higher than the 1.5 seconds voltage threshold value stored in the non-volatile memory. The controller 140 compares the voltage values presented at data ports 142, 144 to the corresponding values in memory and determines that the correct mode of operation is now the third mode, which is a blink mode. The controller 140 then charges both capacitors C1 152 and C2 154. As shown in Table 1, the logic value of capacitors C1 152 and C2 154 are both 1. While the flashlight 10 is in the Blink mode, the light source visibly blinks ON and OFF at a frequency stored in the controller 140.

While the flashlight 10 is in the Blink mode, if it is turned OFF for less than, for example, 1.5 seconds and then turned back ON, the voltage value measured at both data ports 142 and 144 will be higher than each of their corresponding 1.5 seconds voltage threshold values stored in the non-volatile memory. The controller 140 compares the voltage values presented at data ports 142, 144 to the corresponding values in memory and determines the correct mode of operation is now a fourth mode, which is an SOS mode. The controller 140 then discharges both capacitors C1 152 and C2 154. As shown in Table 1, the logic value of capacitors C1 152 and C2 154 are both 0.

As reflected by Table 1, the above process may continue indefinitely while the user indexes through the various modes of operation programmed into the controller 140.

In the embodiment illustrated in FIG. 7, RC circuits 152, 162 and 154, 164 are used as the temporary memory means or devices state machine 150 for memorizing the next mode of operation that controller 140 is to implement at power up. In other embodiments, energy storage devices other than capacitors 152 and 154 may be used. For example, inductors may be used in parallel with the bleed off resistors 162, 164 instead of capacitors 152, 154 to form RL circuits as the temporary energy storage 142, 144.

If flashlight 10 is configured to hold 3 batteries 16 in series, the electronic switch 117 preferably comprises a current-limited load switch to regulate the current provided to light source 14 to a desired level, particularly if light source 14 comprises an LED. Preferably, the electronic switch 117 modulates the DC current from the batteries 16 to a pulsed current. The current limited switch can be a commercial device such as FPF2165 manufactured by Fairchild Semiconductor. The output current delivered to the light source 14 can be set by a resistor 1002 connected to the ISET pin 1001 of the current-limited switch. However, because current-limited load switches of this type have a higher than desired tolerance (e.g., ±25%), if the output current for the switch is set per design requirements to 500 mA, for example, and the switch has a tolerance of ±25%, the actual range of possible output currents for the load switch would be between 375 mA and 625 mA. The manufacturing tolerance of the current-limited load switch would, therefore, produce undesirable intensity differences from flashlight to flashlight.

To minimize light to light fluctuations, the following procedure may be employed to calibrate or normalize the output of the electronic switch 117. First, the ISET resistor for the current-limited load switch may be selected based on a minimum output current desired to be output from electronic switch 117 and delivered to the light source 14.

Because of the wide manufacturing tolerances of the current-limited devices, all most all of the devices will actually output a current above the desired output current limit unless modulated. Accordingly, the controller 140 is configured to control the port 130, and hence the duty cycle input 131 of the electronic switch 117, using a pulse-width modulation (PWM) signal. By adjusting the duty cycle of this PWM signal, the average output current from the electronic switch 117 can be controlled to the desired level.

The duty cycle the controller uses to control the average output current of the current-limited electronic switch 117 to the desired level is stored in non-volatile memory, such an EEPROM embedded in the controller. During the calibration procedure, the initial duty cycle value stored in memory is set at 100% and is then decremented during a functional test until the appropriate duty cycle is reached to produce the desired average output current from the electronic switch 117. In one embodiment, the duty cycle of the current-limited electronic switch 117 is decremented until the electronic switch delivers an output current of 525 mA to the light source 14. Once the desired average current is achieved, the duty cycle resulting in the desired average current is stored back in the non-volatile memory of the controller 114 so that the light source 14 will always operate at that maximum duty cycle during the different modes of operation, with the exception of the power save mode. In the power save mode, the duty cycle is further decremented to result in the desired power savings from the "Normal" mode (e.g., 25% or 50%).

Figure 8:
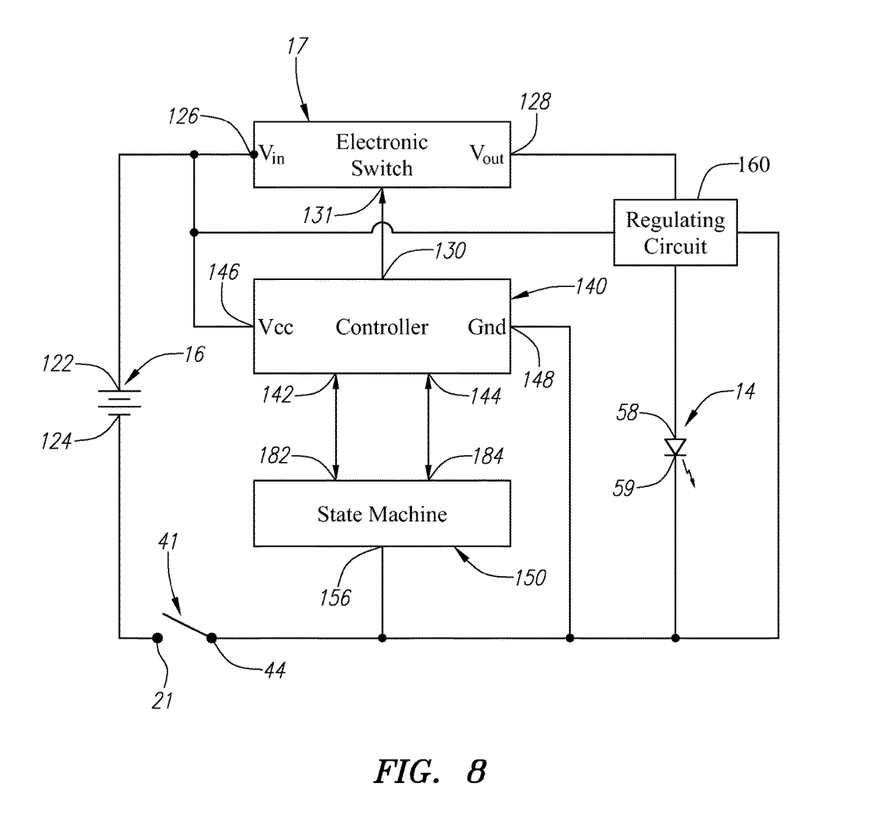
FIG. 8 is another embodiment of a circuit diagram for the flashlight of FIG. 1.

In the foregoing discussion, a current-limited load switch was employed as electronic switch 117 to limit the current delivered to light source 14. In other embodiments, in which it is desired to increase or decrease the current provided by the batteries 16 or other portable source of power to the light source 14, as shown in FIG. 8, a current regulating circuit 160 may be electrically interposed between the output from electronic switch 117 and the light source 114. Depending on the design requirements, current regulating circuit 160 may be a conventional boost converter, buck converter, or boost/buck converter.

Figure 9:
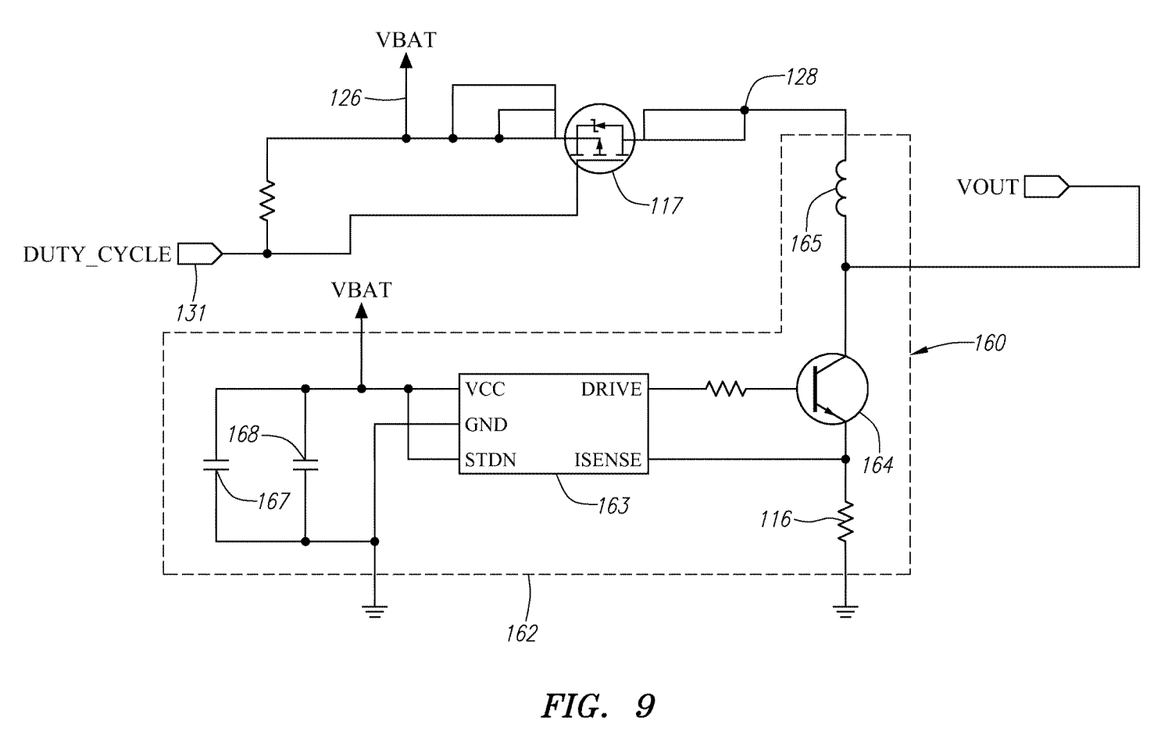
FIG. 9 is a circuit diagram of one embodiment of a regulating circuit for use in the circuit of FIG. 8.

FIG. 9 illustrates a circuit diagram for a regulating circuit 160 comprising a boost converter 162 for boosting the average current delivered to light source 14 from, for example, two batteries 16 connected in series. The boost converter circuit includes a microchip 163, a switching transistor 164, an inductor 165 disposed in series with the electronic switch 117 and light source 14, and a current sense resistor 166 connected in series with the emitter of the switching transistor 164. Capacitors 167, 168 are also provided in the present embodiment between the Vcc pin and the STDN pin and ground for the microchip 163. This is done to limit the voltage drop on the input supply caused by transient in-rush current when the inductor 165 is charging. In the boost converter circuit 162 shown in FIG. 9 light source 14 is supplied with a pulsed current to maximize battery life. In other embodiments, the boost converter may be arranged in a conventional manner to provide a constant current to maximize brightness of light source 14. In one embodiment, microchip 163 preferably comprises a ZXSC310E5 by Zetex Semiconductors. Switching transistor 163 is preferably a bipolar transistor, but may also comprise other switching transistors. Other boost converter circuits may also be employed, including boost circuits that provide a continuous DC current output to the light source 14.

While various embodiments of an improved flashlight and its respective components have been presented in the foregoing disclosure, numerous modifications, alterations, alternate embodiments, and alternate materials may be contemplated by those skilled in the art and may be utilized in accomplishing the various aspects of the present invention. Thus, it is to be clearly understood that this description is made only by way of example and not as a limitation on the scope of the invention as claimed below.

What is claimed is:

1. A lighting device powered by a plurality of batteries connected in series, comprising:
   a light source;
   a current-limited load switch which regulates current delivered to the light source from the plurality of batteries; and
   a controller electrically coupled in series with a mechanical power switch so that when the mechanical power switch is opened, the controller is not powered by the plurality of batteries, the controller including an output for providing a control signal for controlling the opening and closing of the current-limited load switch;
   wherein current delivered to the light source by the current-limited load switch is set by a resistor connected to an ISET pin of the current-limited load switch.

2. The lighting device of claim 1 wherein the light source is comprised of at least one LED.

3. The lighting device of claim 2 wherein the current-limited load switch modulates DC current from the plurality of batteries to a pulsed current.

4. The lighting device of claim 3 wherein the resistor is selected based on a minimum output current desired to be output from the current-limited load switch delivered to the light source.

5. The lighting device of claim 4 wherein the controller is configured to control the output of the current-limited load switch using a pulse-width modulation ("PWM") signal.

6. The lighting device of claim 5 wherein an average output current from the current-limited load switch is controlled to a desired level by adjusting the duty cycle of the PWM signal.

7. The lighting device of claim 6 wherein the duty cycle of the PWM is adjusted through use of a calibration procedure.

8. The lighting device of claim 7 wherein the calibration procedure is comprised of the steps of setting the duty cycle at an initial duty cycle value of 100% and then decrementing the initial duty cycle value during a functional test until an appropriate duty cycle is reached to produce the desired level.

9. The lighting device of claim 8 wherein the appropriate duty cycle is decreased by a preselected amount to achieve a desired power savings for a reduced power mode.

* * * * *